UNITED STATES PATENT OFFICE.

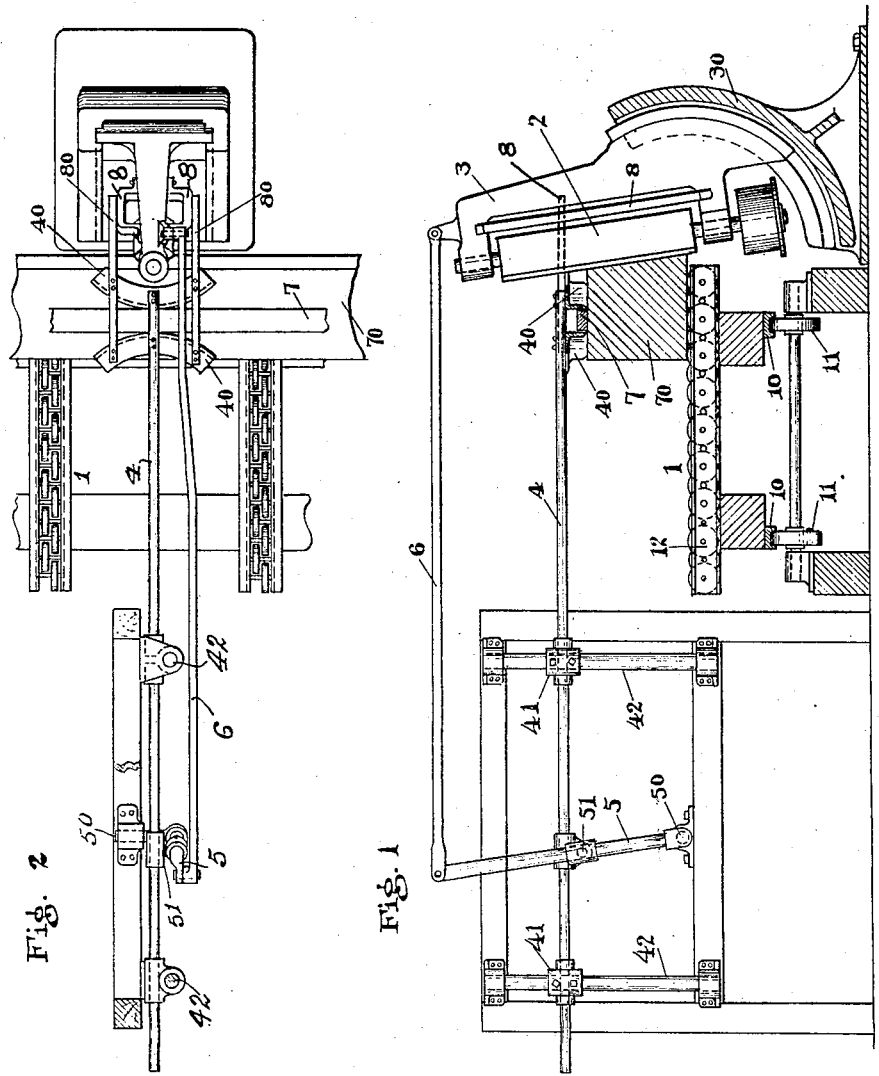

ALBERT J. BEECROFT, OF VICTORIA, BRITISH COLUMBIA, CANADA.

BEVELING-PLANER.

1,284,563.      Specification of Letters Patent.      Patented Nov. 12, 1918.

Application filed December 19, 1917. Serial No. 207,820.

*To all whom it may concern:*

Be it known that I, ALBERT J. BEECROFT, a citizen of the Dominion of Canada, and resident of Victoria, British Columbia, Canada, have invented certain new and useful Improvements in Beveling - Planers, of which the following is a specification.

My invention relates to a wood working machine which is designed for beveling the edges of timber or dressing them in such a way as to secure a bevel, which bevel may, however, not be uniform throughout its length.

The object of my invention is to enable the production of such bevels at any angle within reasonable limits and also to change the angle upon the same stick and to do the whole automatically and in such manner that the time required for setting the machine for different sticks, having different characters of bevels, shall be reduced to a minimum.

My invention consists essentially of a machine which has a cutter head mounted with its axis substantially vertical but in such manner that this cutter head may be swung about a horizontal pivot toward and from the work carrier which is moved past and alongside of the side head.

The features of which my invention consists will be hereinafter set forth and then particularly defined by the claims.

In the accompanying drawings I have shown my invention embodied in the type of mechanism which I now prefer to use, although I am aware that this may be varied in some respects without, however, essentially changing the principles involved, and also so that the same may be within the scope of my invention.

Figure 1 is a transverse sectional elevation through the work holding carriage and the timber thereon, and Fig. 2 is a plan view showing a short section of the carriage.

The carriage 1, upon which the timber is placed for beveling, is provided with rails or guides 10 upon its lower portion which travel upon wheels 11 which are journaled in stationary position. The carriage is reciprocated back and forth in a manner strictly analogous to that of a saw mill carriage. For convenience in moving the timber crosswise of the carriage, I prefer to provide the carriage with sets of rollers 12 spaced at suitable intervals so that the sidewise movement of the timber may be easily secured.

Mounted at the side of this carriage in a suitable frame, is a side head 2. This side head is preferably one having rather long cutting blades, and it is mounted within a frame 3 which is provided with segment flanges 30 fitting within corresponding segment guides so that it may be moved bodily about a horizontal axis which is parallel with the direction of movement of the work holding carriage. It is evident that by adjusting the angular position of the cutter head the side of the timber next thereto will be dressed to a corresponding bevel and if the cutter head be shifted in angular position while the work is passing the bevel given the edge of the timber will vary accordingly. It is, therefore, possible to dress the outer side surface of the timber so as to give the same either an over bevel or an under bevel, or to give it both bevels at different parts of the timber.

A bar 4 extends transversely of the carriage and has guide plates 40 secured thereto and spaced a short distance apart. This bar is mounted to slide in guides 41 which are supported in such manner that they may be adjusted vertically, to thereby vary the vertical height of the bar 4, to correspond with the vertical height of the timber being dressed.

The bar 4 is also pivoted at 51 to a lever 5, which in turn is pivoted at 50 at a point which is on a horizontal level with the pivot axis about which the side head 2 turns when it is rocked. The bar 5 is also connected by its upper end, by means of a link 6, with the upper end of the frame 3 in which the side head 2 is journaled.

To the upper surface of the timber 70 I secure a guide strip or batten 7. Preferably, although not necessarily, this should be sufficiently flexible so that it may be bent into curves of gradual curvature. For this purpose a strip of wood is well adapted. Wood is a good material for this strip for another reason as it permits securing the same to the timber by nails and in such manner that it may be readily removed. As the batten directly actuates the swing of the cutter head about its horizontal pivot axis, it should be securely fixed to the timber.

In preparing the stick for dressing by this machine, the outline of the curve which the bevel will form upon the upper surface, is laid out upon that surface and the guide strip 7 is secured to the surface at a uniform distance from this line. The guide strip 7 is of a thickness to fit snugly between the guide members 40, so that they are in contact with opposite sides thereof at all times. The guide plates 40 are preferably given a curvature so that they present convex sides to the guides 57, as is clearly shown in Fig. 2.

It is evident that as the timber 70 passes by the side head 2, the strip 7 secured thereto will cause the bar 4 to be reciprocated as the curvature of the side being dressed changes. Further, the angular position of the side head will vary in accordance with the position of the guide strip 7. As the guide strip 7 approaches toward the side head, the upper part of the side head will be moved backward and may be moved to a point where its upper end is inclined backward, thus producing an under bevel upon the stick. It is thus seen that the angular position of the side head is controlled by the guide strip 7 through the mechanism described.

To better support the guide members 40 and the projecting end of the rod 4 to which they are secured, I provide the frame of the machine with two vertically placed guide rods 8, one at each side of the head. I also provide two bars 80, which are secured to the guide members 40 and project sufficiently to engage with the vertical bars 8. In consequence, this end of the bar 4 is securely held against movement in the direction of travel of the timber holding carriage.

It is seen that this device positively actuates the swinging movement of the side head in both directions. Furthermore, the guide members 40 have no movement of themselves to produce friction against the side edges of the guide strip and consequently the true character of these edges is preserved.

What I claim as my invention is:

1. A timber beveling planer having a side head mounted to swing about a horizontal axis, means for moving the timber in a direction parallel with said horizontal axis, a flexible batten adapted to be secured on the top surface of the timber, a bar extending transversely of and over the timber, guide members secured to said bar and engaging opposite sides of the batten, a bar pivoted in parallel relation with the rotative axis of the said head and pivoted to the bar which carries the batten-engaging guides and a link connecting said pivoted arm to the frame of the side head to swing the latter.

2. In a timber beveling machine, a side head mounted to swing about a horizontal pivot, means for moving the timber past the side head, a guide strip adapted to be secured to the top surface of the timber, a bar extending transversely of the timber and carrying guide members engaging opposite sides of said guide strip, guides for said bar adjustable vertically, an arm pivoted in parallel relation with the side head and connected with the guide carrying bar, and a link connecting said arm with the side head frame to swing the two in like manner.

Signed at Victoria, B. C., Canada, this 3rd day of December, 1917.

ALBERT J. BEECROFT.